(12) United States Patent
Chien et al.

(10) Patent No.: US 10,472,464 B2
(45) Date of Patent: Nov. 12, 2019

(54) PROCESS FOR PRODUCING A POLYESTER

(71) Applicant: Far Eastern New Century Corporation, Taipei (TW)

(72) Inventors: Chun-Chieh Chien, Taipei (TW); Chih-Chien Lin, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 74 days.

(21) Appl. No.: 15/654,343

(22) Filed: Jul. 19, 2017

(65) Prior Publication Data
US 2018/0340041 A1    Nov. 29, 2018

(30) Foreign Application Priority Data
May 26, 2017    (TW) .............................. 106117568 A

(51) Int. Cl.
*C08G 63/66*    (2006.01)
*C08G 63/85*    (2006.01)

(52) U.S. Cl.
CPC ............. *C08G 63/66* (2013.01); *C08G 63/85* (2013.01)

(58) Field of Classification Search
CPC .................................. C08G 63/66; C08G 63/85
See application file for complete search history.

(56) References Cited

U.S. PATENT DOCUMENTS

| 3,752,846 A * | 8/1973 | Ichikawa et al. ....... | C07C 69/82 528/274 |
| 6,350,851 B1 * | 2/2002 | Inada ..................... | C08G 63/86 524/706 |
| 10,017,454 B2 * | 7/2018 | Hwang ................. | C07C 67/303 |

OTHER PUBLICATIONS

Chen et al "The Kinetics of Diethylene Glycol Formation in the Preparation of Polyethylene Terephthalate", Journal of Polymer Science: Part A: Polymer Chemistry, vol. 36, 3073-3080 (1998) (Year: 1998).*

Rieckmann et al "Poly(Ethylene Terephthalate) Polymerization—Mechanism, Catalysis, Kinetics, Mass Transfer and Reactor Design", Modern Polyesters , Ch.II (Year: 2003).*

\* cited by examiner

*Primary Examiner* — Ling Siu Choi
*Assistant Examiner* — Gennadiy Mesh
(74) *Attorney, Agent, or Firm* — Osha Liang LLP

(57) ABSTRACT

A method for producing a polyester includes: a) preparing a first monomer represented by Formula (1) for example—bis(β-hydroxyethyl) terephthalate (BHET); and b) preparing a second monomer represented by Formula (2) represented by Formula (2)—2-(2-hydroxyethoxy)ethyl 2-hydroxyethyl terephthalate (BHEET). The prepared first and second monomer are then mixed to form a mixture, and then the mixture is subjected to a pre-polymerization reaction at a first temperature not higher than 230° C. to form a prepolymer while a glycol compound represented by Formula (3) wherein R independently represents hydrogen, a C1-C6 linear or branched alkyl group, or phenyl; is continuously removed by distillation. The method also includes subjecting the prepolymer to a polymerization reaction at a second temperature higher than the first temperature to obtain the polyester.

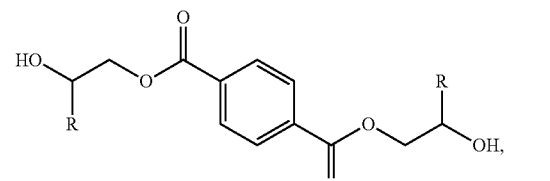

(Formula 1)

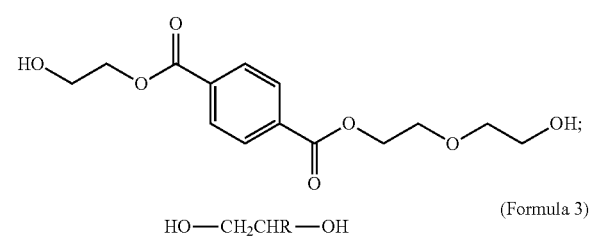

(Formula 2)

HO—CH$_2$CHR—OH    (Formula 3)

9 Claims, No Drawings

PROCESS FOR PRODUCING A POLYESTER

CROSS-REFERENCE TO RELATED APPLICATION

This application claims priority of Taiwanese Application No. 106117568, filed on May 26, 2017.

FIELD

The disclosure relates to a process for producing a polyester, and more particularly to a process for producing a polyester, in which a pre-polymerization reaction is conducted at a relatively low temperature.

BACKGROUND

Synthesis of a polyester, such as polyethylene terephthalate, is usually achieved by an esterification reaction followed by a polycondensation reaction, a transesterification reaction followed by a polycondensation reaction, and a reaction of alkylene oxide with a dicarboxylic acid followed by a prepolymerization reaction and then a polycondensation reaction. For example, terephthalic acid (TPA) is reacted with ethylene oxide to form bis(2-hydroxyethyl) terephthalate (BHET), which is subjected to a prepolymerization reaction at a temperature ranging from 245° C. to 270° C. to form a prepolymer, which is then subjected to a polycondensation reaction at a temperature ranging from 270° C. to 290° C. to obtain polyethylene terephthalate.

U.S. Pat. No. 6,350,851 B1 discloses a method of polymerizing deionized bis-β-hydroxyethyl terephthalate, which includes (1) providing polyester production raw materials including bis-β-hydroxyethyl terephthalate containing cations and anions in a total weight of not more than 50 ppm, ethylene glycol and at least one polymerization catalyst, (2) heating the polyester production raw materials without substantially distilling off ethylene glycol, and (3) polycondensing the raw materials by heating under reduced pressure while distilling off ethylene glycol. In the illustrated examples of U.S. Pat. No. 6,350,851 B1, in step (2), purified bis-β-hydroxyethyl terephthalate is heated at 245° C. to obtain an oligomer, which is polycondensed at 280° C. to obtain polyethylene terephthalate.

SUMMARY

An object of the disclosure is to provide a process for producing a polyester in which a pre-polymerization reaction is performed at a relatively low temperature compared to the temperature for obtaining the oligomer in the aforesaid prior art so as to reduce the total energy consumption for producing polyester such as polyethylene terephthalate.

According to the disclosure, there is provided a method for producing a polyester, comprising:

a) subjecting a mixture which includes a major amount of a first monomer represented by Formula (1) and a minor amount of a second monomer represented by Formula (2) to a pre-polymerization reaction at a first temperature for a period of reaction time such that a prepolymer is formed while a glycol compound represented by Formula (3) is continuously removed by distillation,

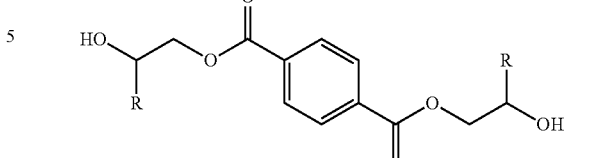
(Formula 1)

(Formula 2)

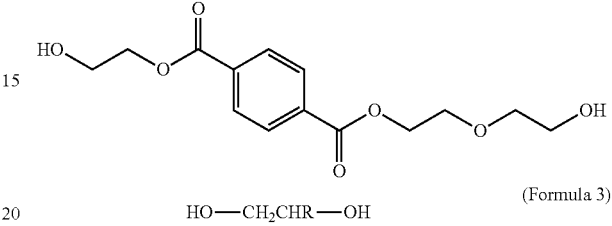

$HO-CH_2CHR-OH$ (Formula 3)

wherein R independently represents hydrogen, a $C_1$-$C_6$ linear or branched alkyl group, or phenyl; and b) subjecting the prepolymer to a polymerization reaction at a second temperature higher than the first temperature to obtain the polyester.

DETAILED DESCRIPTION

An embodiment of a method for producing a polyester according to the present disclosure comprises:

a) subjecting a mixture which includes a major amount of a first monomer represented by Formula (1) and a minor amount of a second monomer represented by Formula (2) to a pre-polymerization reaction at a first temperature for a period of reaction time such that a prepolymer is formed while a glycol compound represented by Formula (3) is continuously removed by distillation,

(Formula 1)

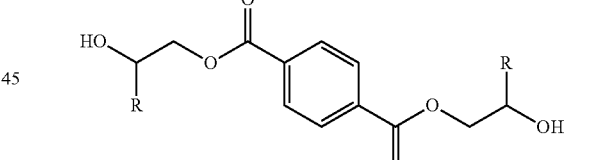
(Formula 2)

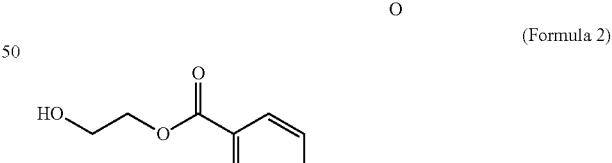

$HO-CH_2CHR-OH$ (Formula 3)

wherein R independently represents hydrogen, a $C_1$-$C_6$ linear or branched alkyl group, or phenyl; and b) subjecting the prepolymer to a polymerization reaction at a second temperature higher than the first temperature to obtain the polyester.

In certain embodiments, the second monomer is in an amount ranging from 0.1 wt % to 10 wt % based on the weight of the first monomer. In certain embodiments, the amount of the second monomer ranges from 0.5 wt % to 5 wt % based on the weight of the first monomer.

In certain embodiments, the first temperature is not higher than 230° C. In certain embodiments, the first temperature ranges from 195° C. to 230° C.

In certain embodiments, the second temperature is 280° C.

In certain embodiments, R in Formulas (I) and (3) independently represents H or ethyl.

In certain embodiments, the mixture further includes a metal oxide catalyst. In certain embodiments, the metal oxide catalyst is selected from a group consisting of an antimony oxide (for example, $Sb_2O_3$), a germanium oxide (for example, $GeO_2$), a titanium oxide (for example, titanium tetrabutoxide), and combinations thereof.

In certain embodiments, the mixture further includes a multifunctional monomer other than the first monomer, the second monomer, and the glycol compound. In certain embodiments, the multifunctional monomer is selected from the group consisting of terephthalic acid, isophthalic acid, 1,4-cyclohexanedimethanol, and combinations thereof. In certain embodiments, the multifunctional monomer is in an amount ranging from 0.1 wt % to 30 wt % based on the weight of the first monomer.

Examples of the disclosure will be described hereinafter. It is to be understood that these examples are exemplary and explanatory and should not be construed as a limitation to the disclosure.

Synthesis Example 1a

Synthesis of a First Monomer (M1a)

Ethylene oxide (2-3 equivalents) was slowly added to a mixture of terephthalic acid (100 g) and water (60 g) at a temperature ranging from 120° C. to 150° C., followed by a reaction for 2 hours to obtain a first monomer (M1a), which was bis(2-hydroxyethyl) terephthalate (BHET).

Synthesis Example 1b

Synthesis of a First Monomer (M1b)

1,2-epoxybutane (2-3 equivalents) was slowly added to a mixture of terephthalic acid (100 g) and water (60 g) at a temperature ranging from 120° C. to 150° C., followed by a reaction for 2 hours to obtain a first monomer (M1b), which was bis(2-hydroxybutyl) terephthalate (BHBT).

Synthesis Example 2

Synthesis of a Second Monomer (M2)

To a reaction vessel (100 ml) were added BHET (10 g, the first monomer (M1a) obtained in Synthesis Example 1a), diethylene glycol (11.4 ml), and zinc acetate (7.4 mg) sequentially, followed by a reaction at 180° C. for 6 hours to obtain a reaction mixture. The reaction mixture was cooled to room temperature and was extracted with a mixture of ethyl acetate and water in a volume ratio of 1:1, followed by removal of ethylene glycol and diethylene glycol and collection of an organic phase. The organic phase was concentrated, followed by purification by column chromatography using a mixture of ethyl acetate and n-hexane in a volume ratio of 3:1 as an eluent, recrystallization using a mixture of ethanol and water in a volume ratio of 1:1, and removal of solid impurities and solvents to obtain a second monomer (M2), which was 2-(2-hydroxyethoxy)ethyl 2-hydroxyethyl terephthalate (BHEET) (i.e., the glycol compound represented by Formula (2)).

Example 1

Production of a Polyester (E1)

To a reaction vessel (1 L) equipped with a stirring device and connected to a vacuuming device were added BHET (350 g, the first monomer (M1a) obtained in Synthesis Example 1a) and BHEET (1.75 g, the second monomer obtained in Synthesis Example 2). The reaction vessel was then purged with nitrogen and heated up to 110° C. to melt BHET and BHEET. $Sb_2O_3$ (0.3 g, as a catalyst) was added into the reaction vessel and mixed with BHET and BHEET homogeneously, followed by a prepolymerization reaction at 200° C. for 1 hour while removing ethylene glycol via distillation to obtain a prepolymer. The prepolymer was subjected to a polymerization reaction at 280° C. under a pressure of 90 Pa for 3 hours to obtain a polyester (E1).

Examples 2-4

Production of Polyesters (E2-E4)

The procedure of Example 1 was repeated except that the amounts of BHEET used in Examples 2-4 were 3.5 g, 17.5 g, and 35 g, respectively.

Example 5

Production of a Polyester (E5)

The procedure of Example 1 was repeated except that BHET was replaced with BHBT obtained in Synthesis Example 1b and that 1,2-butanediol and ethylene glycol were removed via distillation during the prepolymerization reaction.

Example 6

Production of a Polyester (E6)

The procedure of Example 1 was repeated except that the prepolymerization reaction was conducted at 230° C.

Example 7

Production of a Polyester (E7)

The procedure of Example 2 was repeated except that terephthalic acid (105 g) was further added into the reaction vessel before purging with nitrogen.

Example 8

Production of a Polyester (E8)

The procedure of Example 2 was repeated except that isophthalic acid (105 g) was further added into the reaction vessel before purging with nitrogen.

Example 9

Production of a Polyester (E9)

The procedure of Example 2 was repeated except that 1,4-cyclohexanedimethanol (105 g) was further added into the reaction vessel before purging with nitrogen.

Comparative Example 1

Production of a Polyester (CE1)

The procedure of Example 1 was repeated except that BHEET was not added.

Comparative Example 2

Production of a Polyester (CE2)

The procedure of Example 1 was repeated except that the prepolymerization reaction was conducted at 230° C.

Comparative Example 3

Production of a Polyester (CE3)

The procedure of Example 1 was repeated except that the prepolymerization reaction was conducted at 245° C.

Measurement of Properties:

1. Average Polymerization Degree of a Prepolymer:

An average polymerization degree (n) of a prepolymer was calculated from an amount of ethylene glycol distillated during the prepolymerization reaction. The results are shown in Table 1 below.

2. Intrinsic Viscosity of a Polyester:

0.1 g of a polyester obtained in each of Examples 1-9 and Comparative Examples 1-3 was dissolved in a mixture of phenol and tetrachloroethane (25 ml, a weight ratio of 3:2). Intrinsic viscosity (IV, η) was measured at a temperature of 30° C. using an Ubbelohde viscometer. The results are shown in Table 1 below.

3. Hue of Polyester:

Values of CIE L*, CIEa*, and CIEb* of the polyester obtained in each of Examples 1-9 and Comparative Examples 1-3 was measured using a color meter (NE4000, NIPPON DENSHOKU). It is noted that the polyesters obtained in Comparative Examples 1 and 2 may not be pelletized, and thus may not be measured for the values of CIE L*, CIEa*, and CIEb*. The results are shown in Table 1 below.

TABLE 1

| | Average polymerization degree (n) | Intrinsic viscosity (dL/g) | Hue | | |
|---|---|---|---|---|---|
| | | | CIE L* | CIE a* | CIE b* |
| E1 | 3.4 | 0.647 | 83.5 | −1.8 | 0.9 |
| E2 | 3.5 | 0.652 | 84.2 | −1.1 | 1.9 |
| E3 | 3.6 | 0.658 | 83.8 | −1.2 | 0.8 |
| E4 | 3.6 | 0.671 | 82.4 | −1.0 | 0.6 |
| E5 | 3.4 | 0.653 | 83.7 | −1.7 | 0.8 |
| E6 | 3.7 | 0.668 | 83.3 | −1.6 | 1.1 |
| E7 | 3.5 | 0.651 | 83.2 | −1.9 | 0.8 |
| E8 | 3.4 | 0.642 | 83.5 | −1.4 | 0.7 |
| E9 | 3.5 | 0.663 | 82.8 | −1.7 | 0.9 |
| CE1 | 1.2 | 0.236 | — | — | — |
| CE2 | 1.8 | 0.315 | — | — | — |
| CE3 | 3.5 | 0.637 | 86.6 | −2.1 | 3.4 |

As shown in Table 1, the prepolymers in Examples 1-9 have average polymerization degrees ranging from 3.4 to 3.7 and the polyesters in Examples 1-9 have intrinsic viscosities ranging from 0.642 to 0.671. The prepolymer in Comparative Example 3 has a comparable average polymerization degree of 3.5 and the polyester in Comparative Example 3 has a comparable intrinsic viscosity of 0.637. However, the prepolymerization reactions in Examples 1-9 were conducted at temperatures (200-230° C.) lower than that (245° C.) for the prepolymerization reaction in Comparative Example 3. The prepolymers in Comparative Examples 1 and 2 have average polymerization degrees of 1.2 and 1.8, respectively, which are much lower than those of the prepolymers in Examples 1-9. The polyesters in Comparative Examples 1 and 2 have intrinsic viscosities of 0.236 and 0.315, respectively, which are much lower than those of the polymers in Examples 1-9. Therefore, the polyesters obtained in Comparative Examples 1 and 2 may not be pelletized. In addition, the color of the polyester in Comparative Example 3 is relatively greenish and yellowish as compared to the colors of the polyesters in Examples 1-9.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A process for producing a polyester, comprising:

a) preparing a first monomer represented by Formula (1):

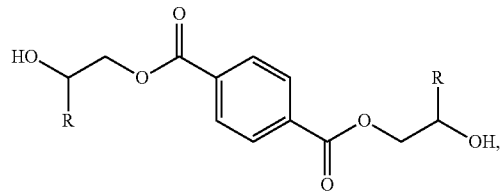

(Formula 1)

wherein R independently represents hydrogen, a $C_1$-$C_6$ linear or branched alkyl group, or phenyl;

b) preparing a second monomer represented by Formula (2):

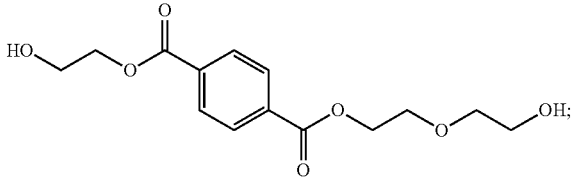

(Formula 2)

c) mixing the prepared first and second monomers to form a mixture, wherein the second monomer is in an amount ranging from 0.1 wt % to 10 wt % based on 100 wt % of the first monomer in the mixture, and subjecting the mixture to a pre-polymerization reaction at a first temperature not higher than 230° C. to form a prepolymer while a glycol compound represented by Formula (3) is continuously removed by distillation; and

HO—CH$_2$CHR—OH                           (Formula 3)

d) subjecting the prepolymer to a polymerization reaction at a second temperature higher than the first temperature to obtain the polyester.

2. The process for producing a polyester according to claim 1, wherein the amount of the second monomer ranges from 0.5 wt % to 5 wt % based on 100 wt % of the first monomer in the mixture.

3. The process for producing a polyester according to claim 1, wherein the first temperature ranges from 195° C. to 230° C.

4. The process for producing a polyester according to claim 1, wherein R independently represents H or ethyl.

5. The process for producing a polyester according to claim 1, wherein the mixture further includes a metal oxide catalyst.

6. The process for producing a polyester according to claim 5, wherein the metal oxide catalyst is selected from a group consisting of an antimony oxide, a germanium oxide, a titanium oxide, and combinations thereof.

7. The process for producing a polyester according to claim 1, wherein the mixture further includes a multifunctional monomer other than the first monomer, the second monomer, and the glycol compound.

8. The process for producing a polyester according to claim 7, wherein the multifunctional monomer comprises terephthalic acid, isophthalic acid, 1,4-cyclohexanedimethanol, or combinations thereof.

9. The process for producing a polyester according to claim 7, wherein the multifunctional monomer is in an amount ranging from 0.1 wt % to 30 wt % based on 100 wt % of the first monomer in the mixture.

* * * * *